No. 711,593. Patented Oct. 21, 1902.
G. B. SHEPARD.
MATRIX MAKING MACHINE.
(Application filed Nov. 6, 1891.)
(No Model.) 11 Sheets—Sheet 1.
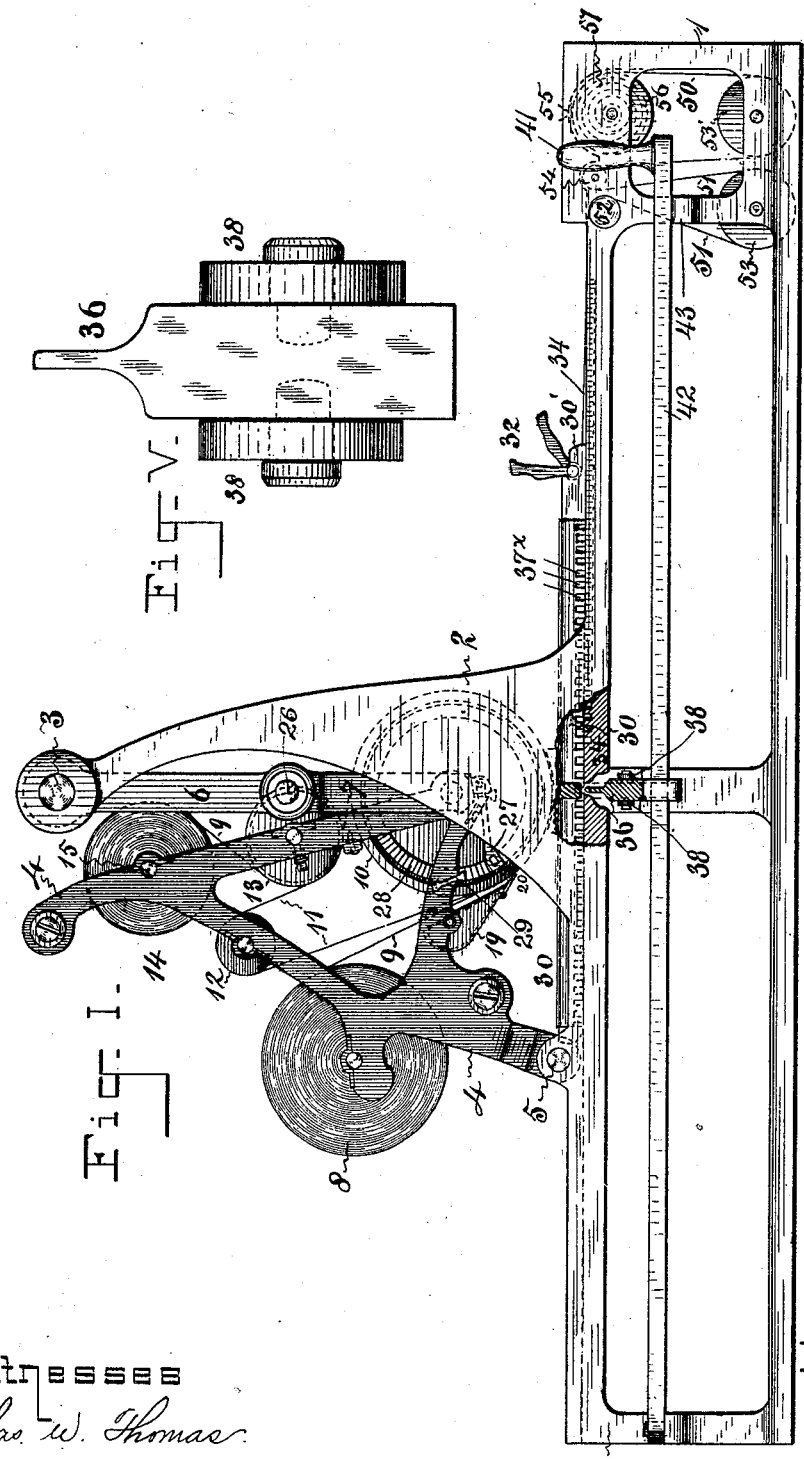
Witnesses
Chas. W. Thomas
Lillie Hanna
Inventor
George B. Shepard
By Knight Bros.
Attys No. 711,593. Patented Oct. 21, 1902.
G. B. SHEPARD.
MATRIX MAKING MACHINE.
(Application filed Nov. 6, 1891.)
(No Model.) 11 Sheets—Sheet 2.
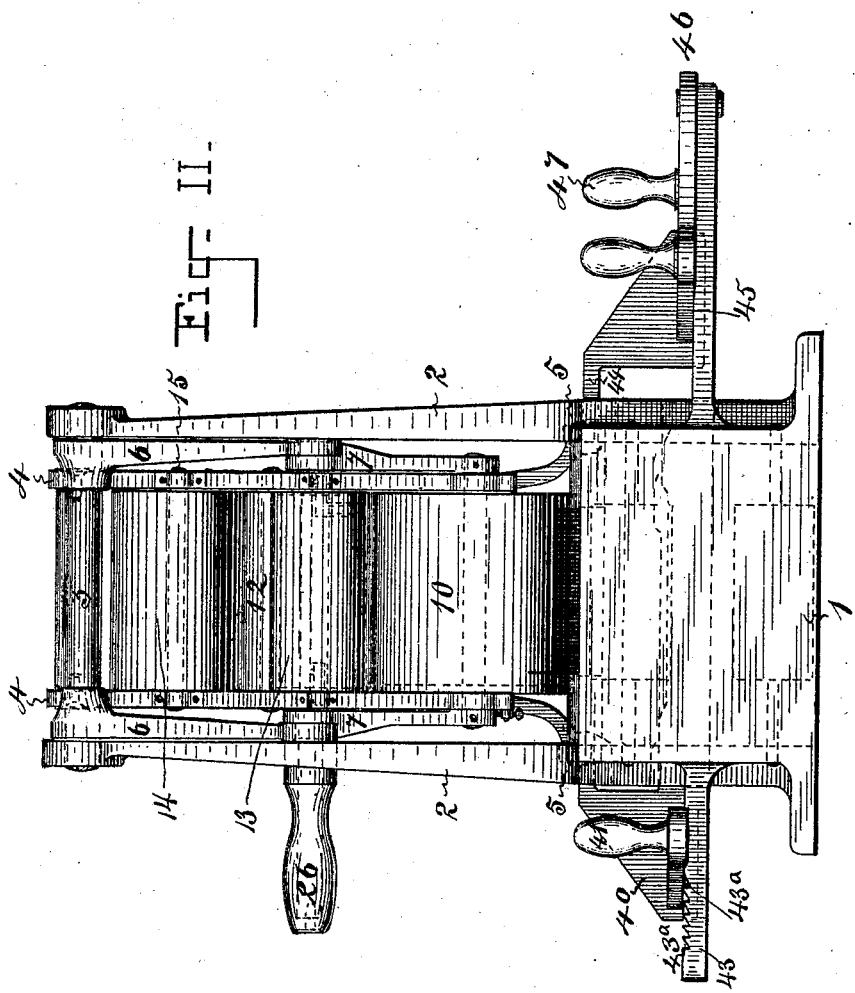

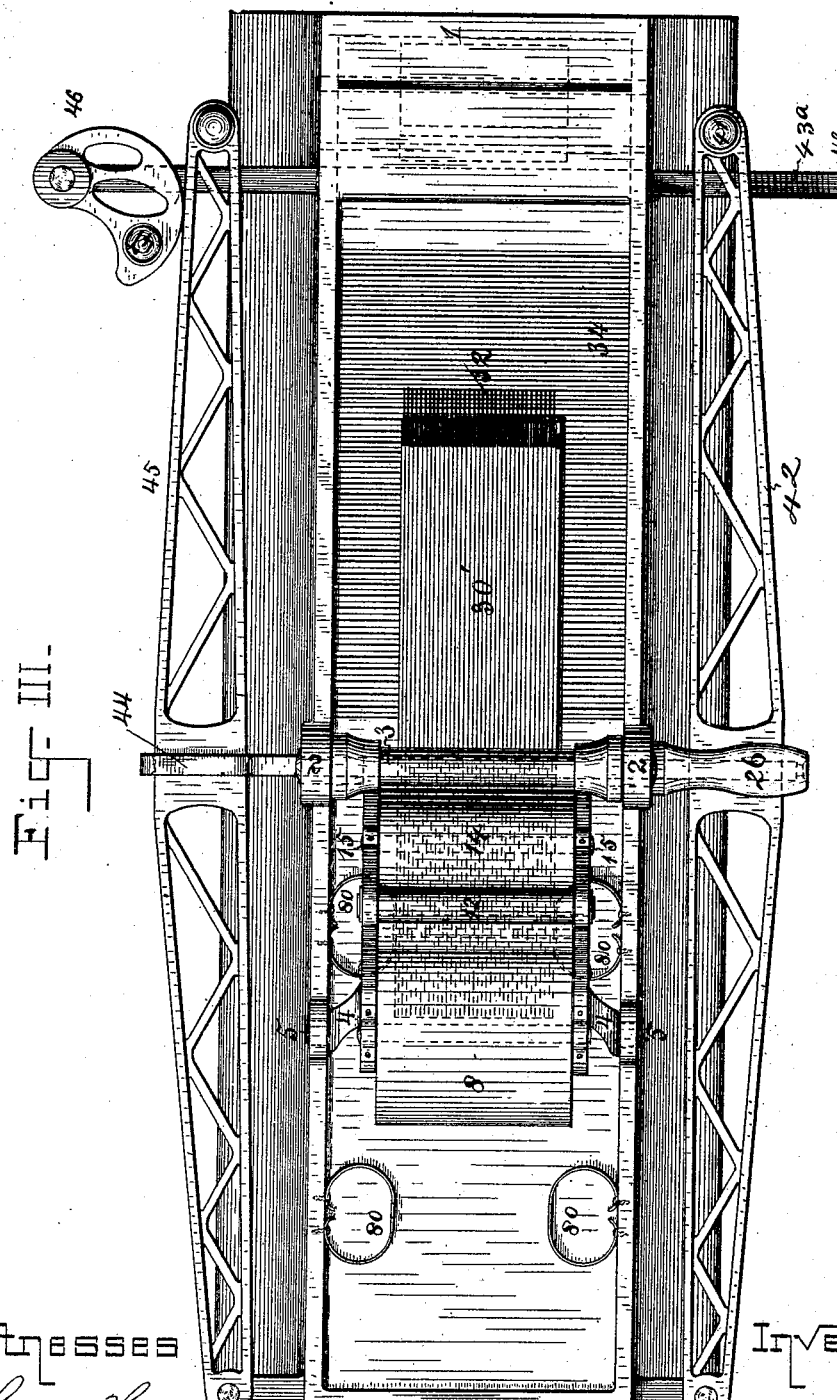

No. 711,593. Patented Oct. 21, 1902.
G. B. SHEPARD.
MATRIX MAKING MACHINE.
(Application filed Nov. 6, 1891.)
(No Model.) 11 Sheets—Sheet 4.
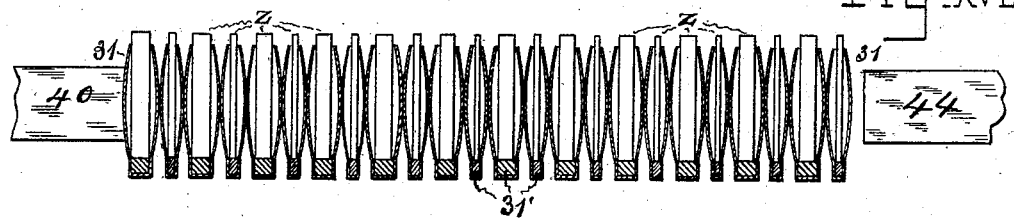
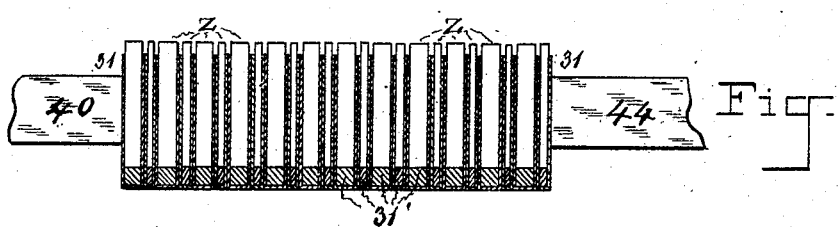
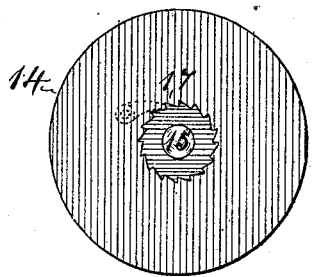
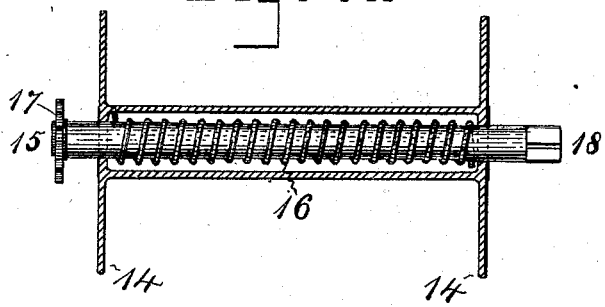
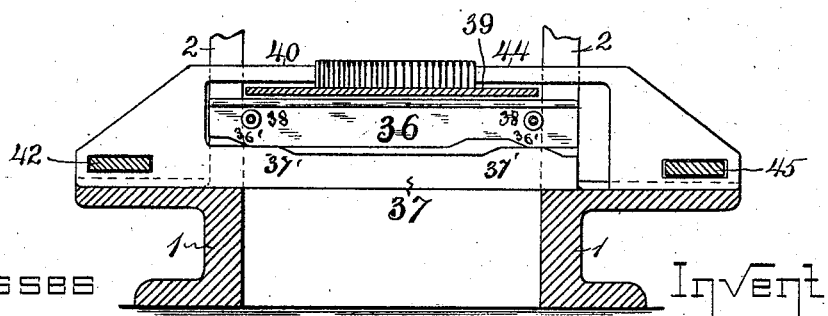
Witnesses
Chas W. Thomas
Lillie Hanna
Inventor
George B. Shepard
By Knight Bros
Attys
THE NORRIS PETERS CO., PHOTO-LITHO., WASHINGTON, D. C.

No. 711,593. Patented Oct. 21, 1902.
G. B. SHEPARD.
MATRIX MAKING MACHINE.
(Application filed Nov. 6, 1891.)
(No Model.) 11 Sheets—Sheet 5.
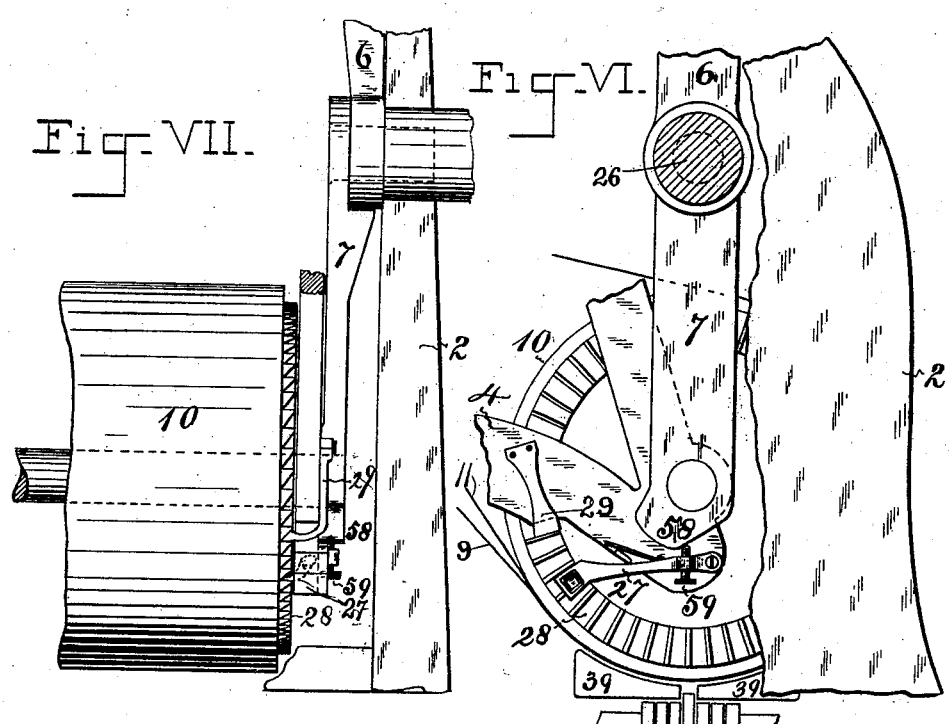
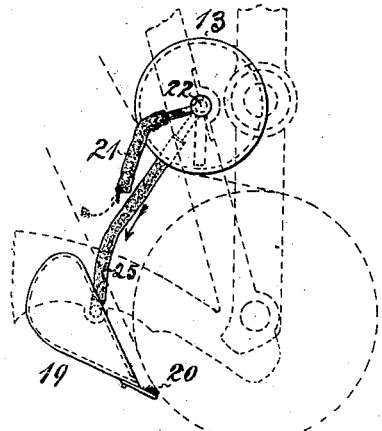
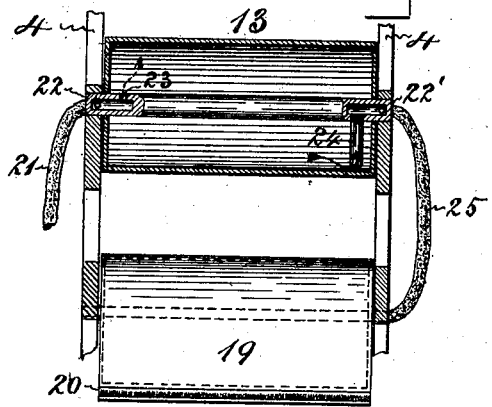
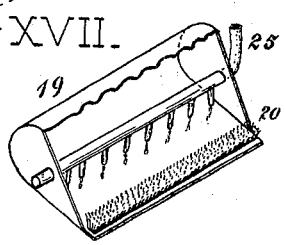
Witnesses
Chas. W. Thomas
Lillie Hanna
Inventor
George B. Shepard
By Knight Bros
Attys No. 711,593. Patented Oct. 21, 1902.
G. B. SHEPARD.
MATRIX MAKING MACHINE.
(Application filed Nov. 6, 1891.)
(No Model.) 11 Sheets—Sheet 6.
60
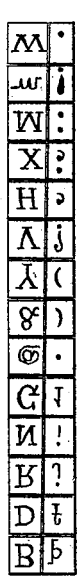
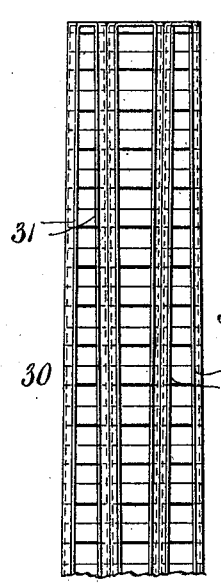
Fig. XIII.
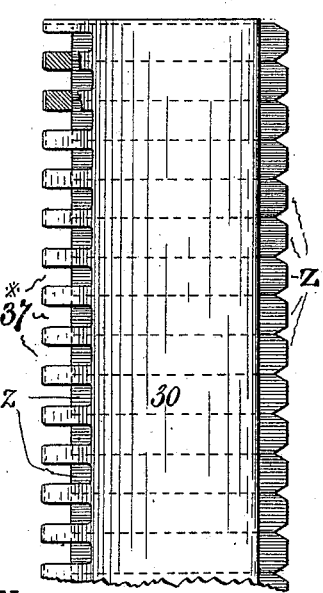
Fig. XII.
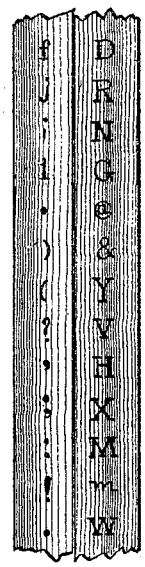
Fig. XXIV.
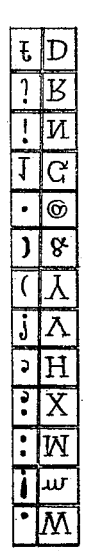
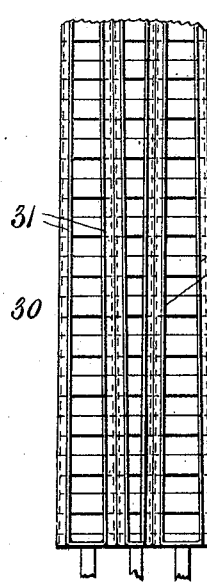
Fig. XV.
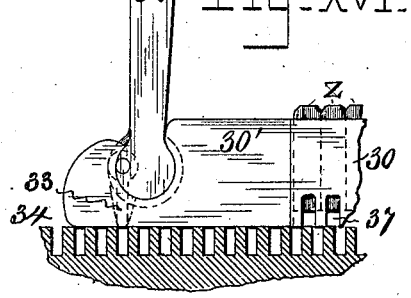
Fig. XVI.
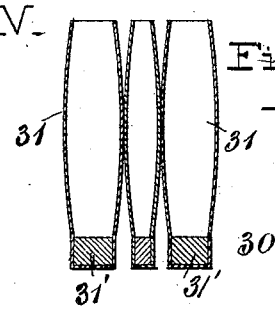
Fig. XIV.
Witnesses
Chas. W. Thomas
Lillie Thomas
Inventor
George B. Shepard
By King & Bro.
Attys

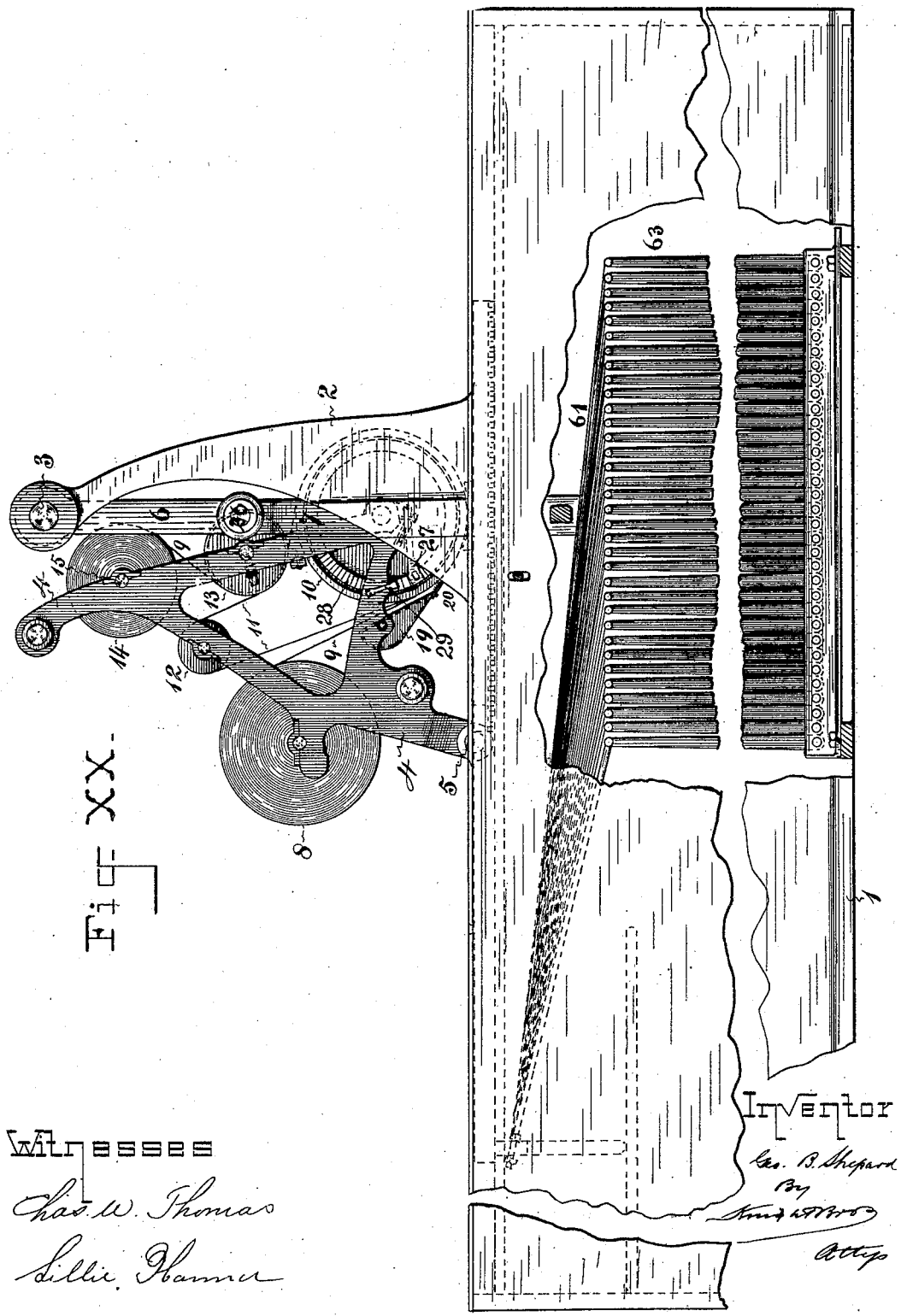

No. 711,593. Patented Oct. 21, 1902.
G. B. SHEPARD.
MATRIX MAKING MACHINE.
(Application filed Nov. 6, 1891.)
(No Model.)
11 Sheets—Sheet 8.
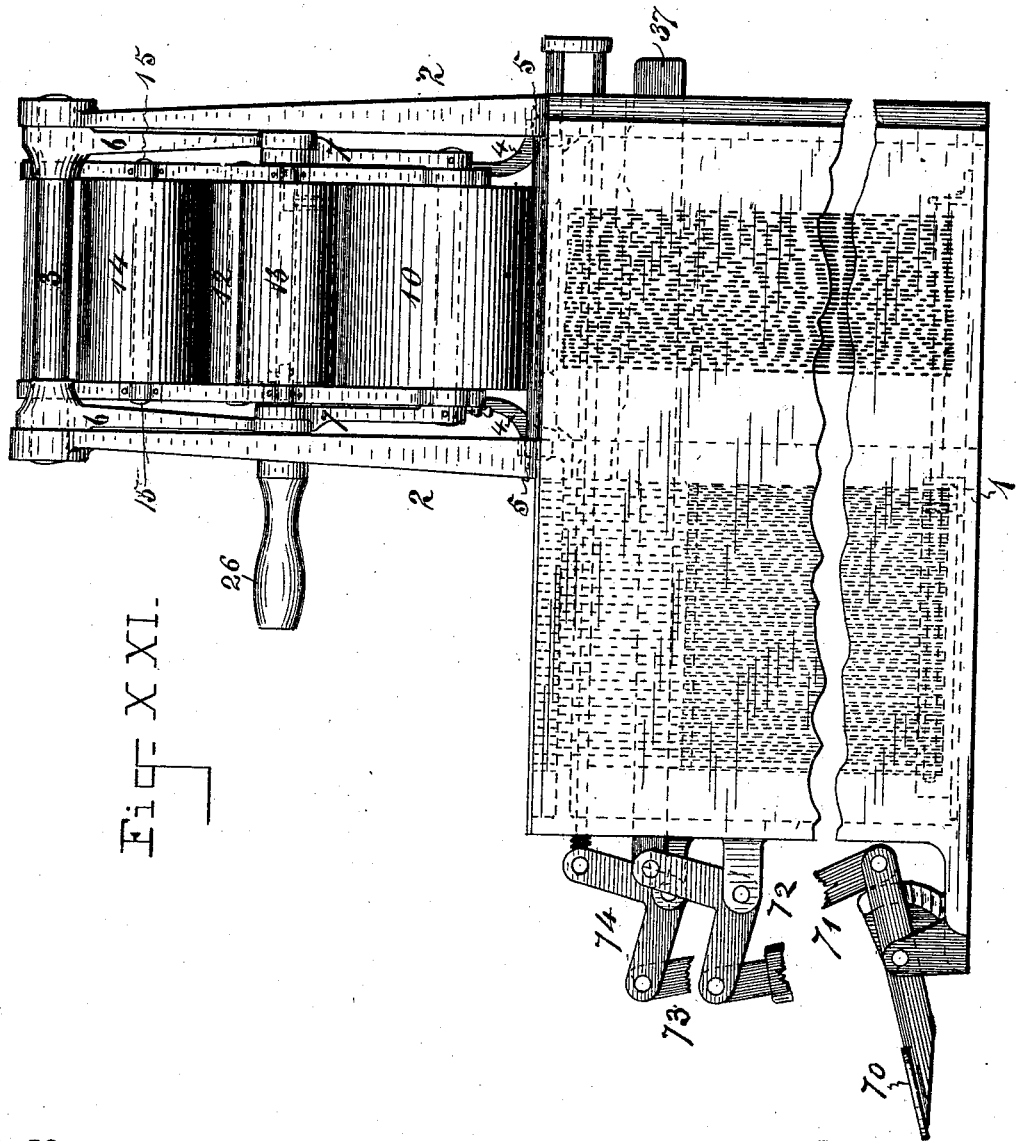
Witnesses
Chas. W. Thomas
Lillie Hanna
Inventor
George B. Shepard
By Knight Bros
Attys

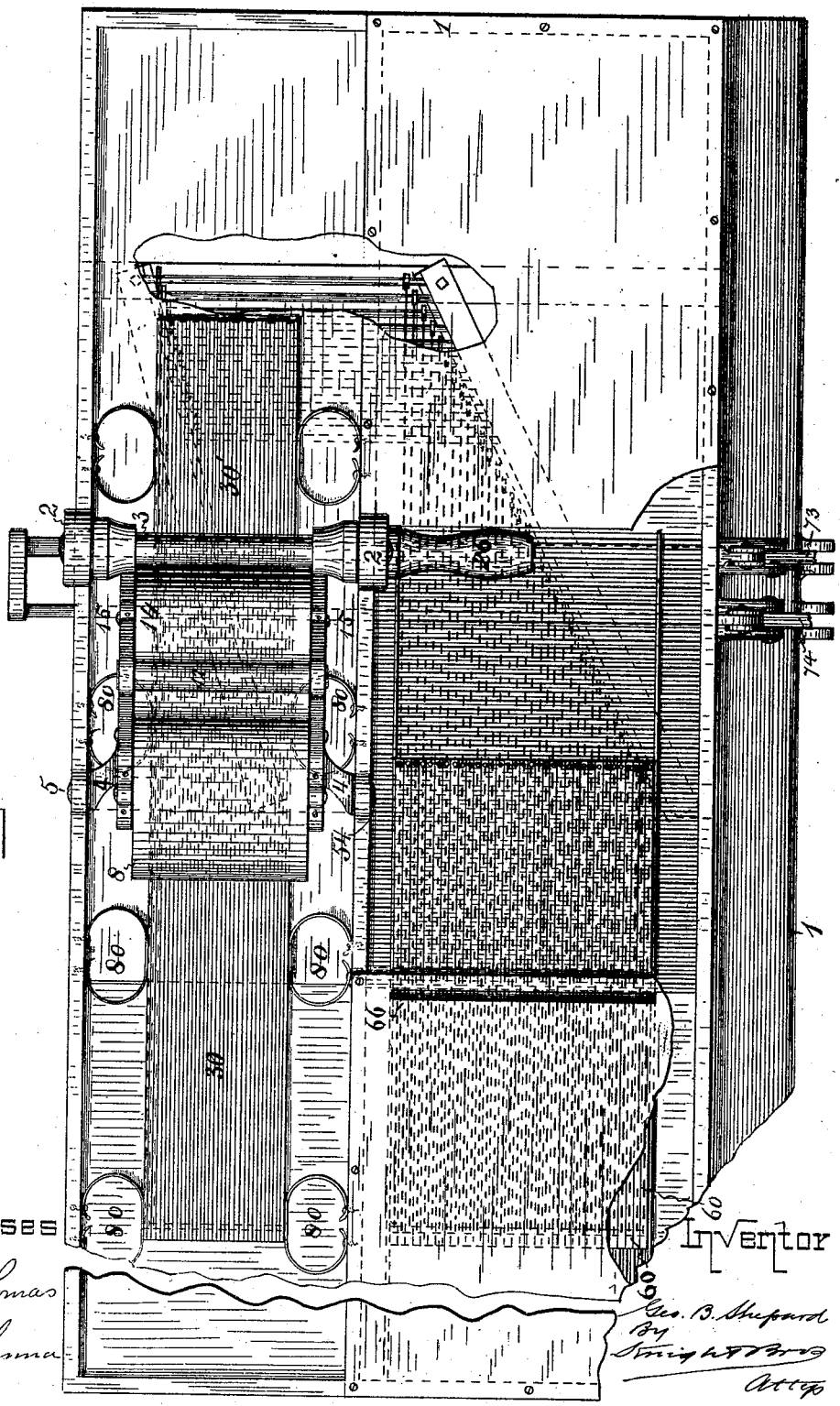

No. 711,593. Patented Oct. 21, 1902.
G. B. SHEPARD.
MATRIX MAKING MACHINE.
(Application filed Nov. 6, 1891.)
(No Model.) 11 Sheets—Sheet 10.
Fig. XXIII.
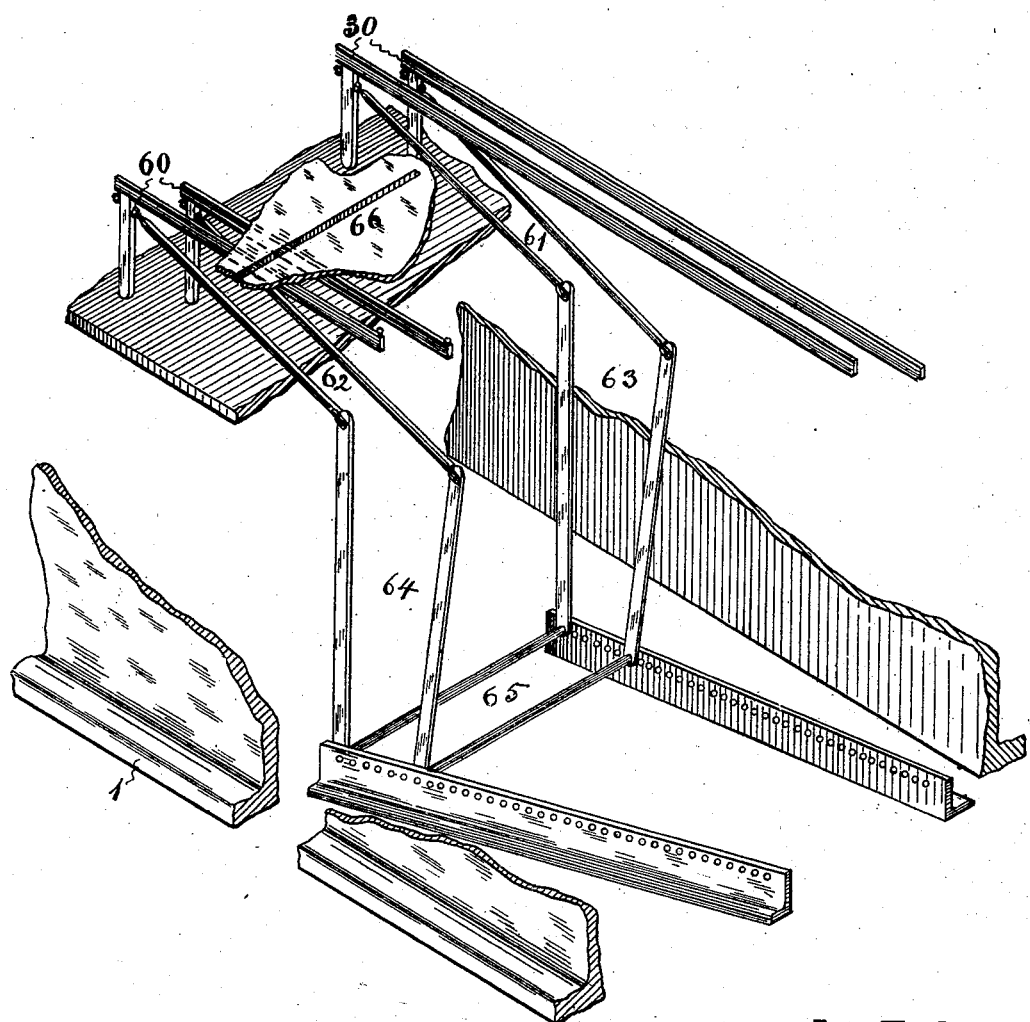
Witnesses
Chas. W. Thomas
Lillie Hannia
Inventor
George B. Shepard
By Knight Bros
Attys

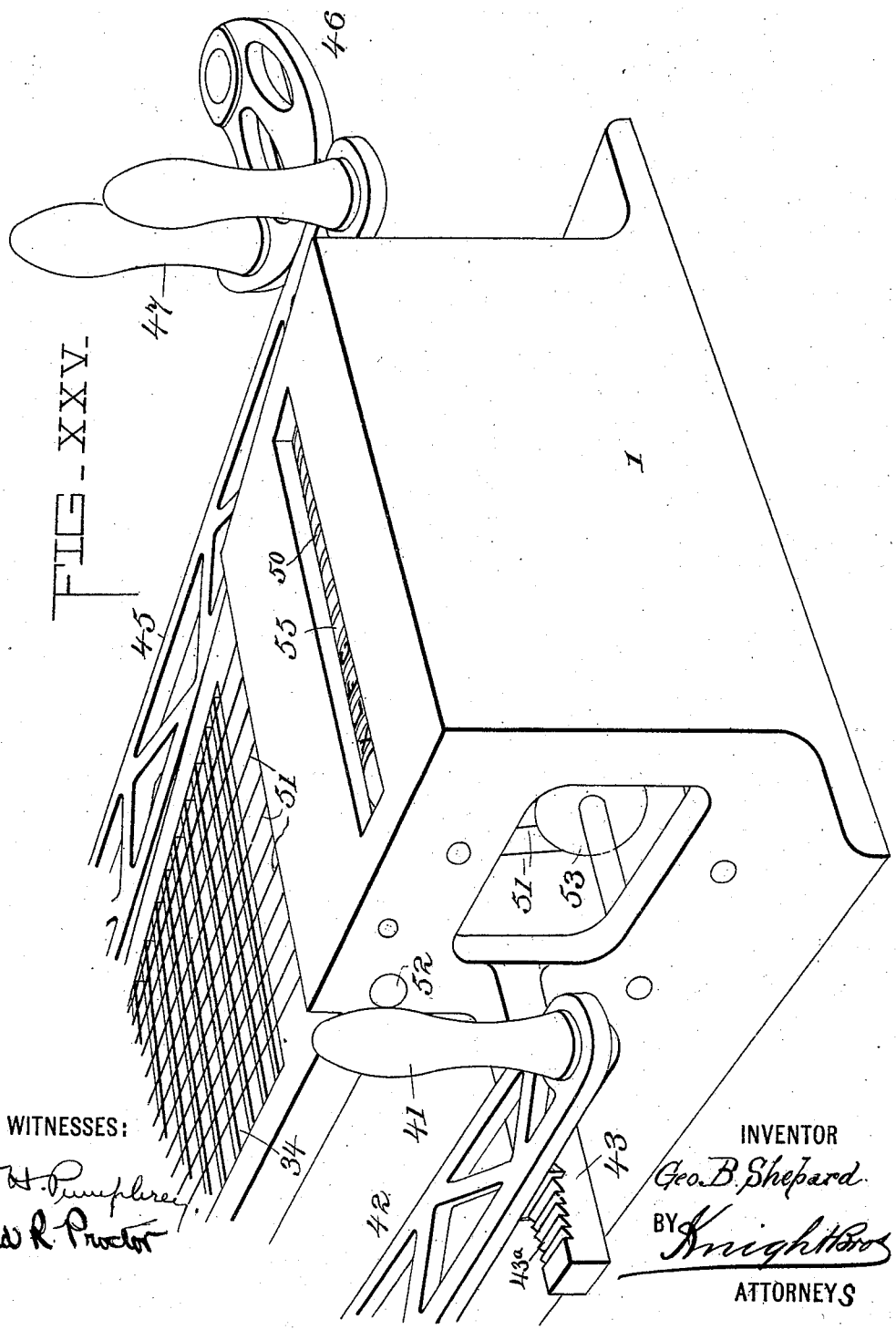

United States Patent Office.

GEORGE B. SHEPARD, OF OGDENSBURG, NEW YORK.

MATRIX-MAKING MACHINE.

SPECIFICATION forming part of Letters Patent No. 711,593, dated October 21, 1902.

Application filed November 6, 1891. Serial No. 411,050. (No model.)

*To all whom it may concern:*

Be it known that I, GEORGE B. SHEPARD, a citizen of the United States of America, residing at Ogdensburg, in the county of St. Lawrence and State of New York, have invented a new and useful Matrix-Making Machine, of which the following is a specification.

The subject of my invention is a machine for producing matrix-sheets for stereotype or electrotype plates. The matrix material is carried in a web or sheet upon reels mounted, together with a cylindrical platen, in a frame having an oscillating movement and imparting step-by-step rotation to the platen after each stroke, so as to produce impressions line by line in the matrix-sheet. Separate fonts of type are arranged in vertical series, in the order of their width, in tapering holders arranged alternately as to their wide and narrow ends and shifted independently to bring the required types into alinement. The selected line of type is lifted relatively to the holders, firmly supported in its elevated position, and clamped within the required width of page or column preparatory to each impression.

Referring to the accompanying drawings, which form a part of this specification, Figure I, Sheet 1, is a side elevation of a matrix-making machine embodying my invention. Fig. II, Sheet 2, is an end elevation of the same. Fig. III, Sheet 3, is a plan of said machine. Fig. IV, Sheet 4, is a transverse section of a part of the machine in the plane of the type-lifter. Fig. V, Sheet 1, shows the type-lifter detached. Fig. VI, Sheet 5, is an end view; and Fig. VII, Sheet 5, is a side view, which show portions of the cylindrical platen, the type-lifter, and coacting parts. Fig. VIII, Sheet 5, shows the moistener by front view and the drying cylinder by axial section. Fig. IX, Sheet 5, shows said moistener and said drying-cylinder in end elevation. Fig. X, Sheet 4, is an axial section, and Fig. XI, Sheet 4, is an end view, of the receiving-reel. Fig. XII, Sheet 6, is a side view of a portion of the type-holder with some type in position. Fig. XIII, Sheet 6, is a plan of a portion of a series of such type-holders, showing the relative position in which the same are grouped upon my said machine. Fig. XIV, Sheet 6, is a transverse section, on a larger scale, of three contiguous type-holders. Fig. XV, Sheet 6, is a top view showing the relative position of the type within such type-holder. Fig. XVI, Sheet 6, is a side view of the finger-lever and locking-pin employed upon the forward end of my type-holder, part of the supporting bed-plate being represented in section. Fig. XVII, Sheet 5, is a perspective view of the moistener. Fig. XVIII, Sheet 4, is a vertical section which shows a series of said type-holders in their expanded condition and with types in position. Fig. XIX, Sheet 4, is a like section of the same contracted so as to clamp the rows of type. Fig. XX, Sheet 7, shows by side elevation a modified form of my matrix-machine, a portion of the side of the base being cut away to show the arrangement of rocking levers and the rods which connect the index-bars with their respective type-holders. Fig. XXI, Sheet 8, is an end elevation, and Fig. XXII, Sheet 9, is a plan, of said modified form. Fig. XXIII, Sheet 10, is a diagram representing the mechanism which connects the index-bars with their respective type-holders in the said modified form of my machine. Fig. XXIV, Sheet 6, is a top view which represents portions of such index-bars, showing the arrangement of lettering thereon. Fig. XXV, Sheet 11, is a detail perspective view of the indicating device hereinafter described.

1 represents a base or bed plate; 2, standards erected thereupon; 3, a strut which connects the tops of said standards.

4 is a rocking frame supported on fulcrums 5 upon the base and coupled to said strut 3 by a toggle 6 7. Journaled in frame 4 is my delivery-roll 8, upon which the roll of matrix material 9 (preferably a spongy form of cardboard about three-sixteenths of an inch thick) is placed.

10 is my cylindrical platen or pressure-sustaining cylinder.

11 is my supporting-band, (preferably of steel,) which is stretched about said platen and an idler 12. This steel band serves as a traveling support or backing for the matrix material and insures even feed thereof to the impression-cylinder and thence to the drying-cylinder 13.

From the drying-cylinder the sheet of matrix material is carried to a taking-up reel 14, whose shaft 15 is journaled in rocking frame 4 and is provided with spring 16, Fig. X, ratchet device 17, Figs. X and XI, and winding-arbor 18, one member of the ratchet device being mounted on the reel 14 and the other on its winding-arbor 18, Fig. X, so that having been wound up like a clock-spring the recoil of the spring operates to preserve a constant tension on the sheet of matrix material and to wind up the same on said reel. Where necessary, the proper humidity of the matrix material may be preserved by a moistening device, Figs. I, XVII, and XX, consisting of a pan or font 19 and dristributing-brush 20.

21, Figs. VIII and IX, represents a flexible tube which conveys escape-steam through the hollow shaft 22 of the drying-cylinder 13. This shaft is fixed in frame 4, and the said cylinder revolves around it. An orifice 23 in said shaft allows steam to escape into and heat the cylinder. A downturned pipe 24, that communicates with the lower part of said cylinder, conveys water of condensation through hollow shaft and tube 25 at other end of said cylinder to pan or font 19, and thus operates to keep the distributing-brush 20 charged with water. A moderate pressure of steam within the drying-cylinder 13 will suffice to deliver water of condensation to the tube 25.

26 is a handle that extending from toggle 6 7 enables the operator to relax or straighten the toggle at will and by so doing to rock the frame 4. Each such oscillation to and fro of the frame 4 causes a spring-pawl 27, Figs. VI and VII, which engages in a circular rack 28 on the cylindrical platen, to rotate the said platen the distance of one line of reading-matter, a spring-detent 29, which also engages in said ratchet, operating to hold the cylinder 10 firmly to such adjustment during the operation of impressing the matrix material with one line or row of characters. The said action of the spring-pawl 27 is brought about by impact of cam projection 58 of toggle member 7 against screw 59 on said pawl. The precise vibration desired for effective action of said pawl is obtained by adjusting said screw. The spring-pawl 27 and detent 29 are attached to the rocking frame 4, as shown in Fig. VI.

The machine further comprises a series of type-holders or type-receptacle bars 30, supported on the base or bed plate, of which each has an extension 30', provided with a finger-lever 32 and a dog 33, which engages in the teeth of a rack 34, which is securely fastened to the base 1. These type-holders are preferably made tapering from end to end, as shown in Figs. XIII, XIV, and XV, for reception of the different widths of type of the kind in ordinary use for printing, the type Z being placed upright therein, with the notched side of one type next the opposite side of the next type, and so on until filled. The relative positions of the characters on such type may be varied to suit circumstances, while the general principle of placing the narrowest type at the narrowest end of the type-holder and of gradually-increasing width toward the wider end of such holder is preserved. The side walls 31 of the type-holders are of steel plate made slightly convex, (see Figs. XIV and XVIII,) so as to allow compression thereof laterally (see Fig. XIX) for the purpose of justifying the line when set. In the bottom of each type-holder is a body of solid metal, as at 31', to limit the drop of the type after the lifter 36 is retracted in the manner presently to be described, and the bottom of said holder has transverse notches 37* (see Fig. XII) to permit entrance of the upper edge of the lifter 36 to raise a line of type for the impression of the matrix-sheet. The said type-holders 30, with their included type, are placed upon the bed-plate alternately, with the wide end of one next the narrow ends of those immediately next to it, and so on throughout the series. The compressible walls 31 of the respective hollow type-holders 30 terminate at their lower ends at the limit of the upward movement of the lifter 36.

The type-lifter 36, Fig. IV, has oblique surfaces 36', against which act similarly oblique edges 37' of a reciprocating cam-bar 37. The motion up and down of lifter 36 is facilitated by antifriction-rollers 38. Stops 39, Figs. IV and VI, serve to restrict the action of the lifter 36 to a single row of type, one of said stops 39 being shown in section in the first-mentioned figure. Each type-holder having been drawn longitudinally of the machine until the character desired is brought into the plane of the lifter is locked in that position by means of the finger-lever 32 and dog 33. Then the abutment 40, carried by the cam-bar 37, Fig. IV, having been pressed inward to the desired distance by means of the handle 41 of the bar 42, Figs. III and IV, is retained to that adjustment by engagement of its bar 42 in one of a series of notches 43ª of the rack 43. The jaw 44, carried by the bar 45, Figs. III and IV, is then pressed toward the said abutment by moving its bar 45 inward by rotation of cam 46 by means of its handle 47. This movement of the clamp-jaw 44 relatively to the fixed abutment 40 results in locking the types in their holders, as seen in Fig. XIX.

Each type-holder may be provided with a steel index-ribbon 50, Fig. I, attached to its forward end through the medium of a metallic cord or chain 51, which is carried over a smooth glass or steel bar 52, from which said cords pass downward and around a series of grooved sheaves 53, hung loosely upon a common stud-shaft, so that they may be capable of a slight endwise self-adjustment thereon, and then up over another series of grooved sheaves 54, sleeved upon a common stud-shaft at set distances from center to center. After passing over sheaves 54 these cords are connected to one end of the said index-ribbons, which are passed around sheaves 53', so that when the type-holder is at its extreme limit of motion away from the index sight or peep hole 55, Fig. XXV, the end of the ribbon will just reach the sheave 54.

56 represents sheaves sleeved upon a common stud-shaft fastened to the framework of the machine, and the periphery of each sheave has a square transverse face of such width as to correspond with the width of the index-ribbons employed, which may be twice the average width of the type-holders, in order to enable said ribbons to be marked with large and conspicuous characters.

Each sheave 56 is hollow and contains a helical or a volute spring, (see dotted lines 57,) one end of which is fastened to the inner circumference of such sheave and the other to the stud-shaft, such spring being put under tension sufficient to cause the index-ribbon to wind itself up automatically upon its appropriate sheave whenever relieved from the pull of the attached cord. Between each consecutive two sheaves is placed a thin washer of slightly-greater diameter than that of the sheaves to retain each index-ribbon to its proper sheave. One end of the index-ribbon is attached to the periphery of its appropriate sheave 56, so as to readily wind thereupon whenever at liberty so to do. Similar washers may be applied to each series of sheaves. Springs 80, Fig. III, are provided to prevent spreading of the gang of type-holders when moved rearward.

In operating the form of machine above shown I first throw back the rocking frame 4 toward the rear of the machine by means of the handle 26, attached to the toggle-lever bars 6 and 7, thereby raising the impression-cylinder or cylindrical platen 10 from contact with the type. I then set each type bar or holder at the position desired by means of the finger-lever 32, which is first raised in upright position, releasing the dog 33 from the rack 34 in the bed-plate 1, the type-bar being pushed rearwardly or drawn forward, as desired, by hand, the correct position thereof being shown upon the index-ribbon 50 through the index sight-opening 55. I then drop the lever 52, so as to lock the dog 33 into the transverse rack shown in bed-plate, Fig. I. I then proceed in like manner with the adjoining type-holders or receptacle-bars from left to right until the width of desired line is more than occupied by the bars so set. The characters showing through the sight-opening 55 indicate the correct reading of the line of types above the lifter 36, and correction of any errors therein can then be made in same manner as originally set. I then set the left-hand margin of the line by means of the stop 40, actuated by the lever 42, which drops into one of a series of notches 43$^a$ of a rack 43 of the frame upon the left-hand side, thus holding the lever 42 in a set position. This lever 42 also actuates the sliding bar 37.

I then compress the right-hand margin to proper position by means of the clamp-jaw 44, actuated by the lever 45, which is set laterally in any desired position by means of the cam 46, attached to an extension of the right-hand side of said framework. Upon the upper edge of the sliding bar 37 are cut the inclines 37' 37', which meet similar inclines 36' 36', cut upon the lower edge of the lifter 36, forcing the latter upward when the sliding bar 37 is forced from left to right, as above explained. When said lifter 36 is forced upward, as above explained, the upper edge thereof engages with the lower ends of the transverse line of types set within the type-receptacle bars 30, forcing such transverse line above the surface of the adjoining types, the motion of such adjoining types being limited by the stops 39, extending transversely above said type-bars and attached to side frame of such machine. When the said transverse line of types is so set and raised, I bring forward the rocking frame 4, carrying the matrix material upon the impression-cylinder 10, which has been previously dampened by passing in front of the font 19, and by straightening the toggle-joints 6 7 by means of the handle 26 I force such matrix material down a limited distance upon the face of the transverse line of raised type, thereby producing an impression of the entire line so set across the face of the matrix material. I then proceed in similar manner for the production of succeeding lines, the matrix material being advanced by the retrograde movement of the rocking frame 4 the distance required between lines by means of the pawl 27, working on the rack 28 upon the end of the impression-cylinder 10. This pawl 27, which is pivotally attached to the frame 4, is actuated by means of the cam 58, shown at the lower end of the toggle-bar 7, through the set-screw 59, the reverse movement of the impression-cylinder 10 being prevented by means of the dog 29 engaging with said rack.

In the modified form of construction shown in Figs. XX, XXI, XXII, XXIII, and XXIV the type-holders 30 are designed to be operated through the medium of supplementary index-bars 60, connected to said holders by means of rods 61 62 and the arms 63 64, which extend upward from shaft 65. In this construction such index-bars may be twice the width of the type-holders to afford space to make characters on said bars more plainly visible. An index sight-slot 66 or a gage-bar is placed above the series of index-bars, so as to indicate when the corresponding type is brought in vertical alinement with the lifter 36.

In operating the modified form of my matrix-making machine I first throw back the rocking frame 4, as above described. I then set the type-receptacle bars at the position desired, respectively, by means of the index-bars 60, which carry upon their upper surfaces index-letters, as shown at Fig. XXIV, these index-letters being set to line under a transverse sight bar or slot, (shown at 66,) each index-bar being attached at its rear end to an individual rod 62, pivotally connected to the upper end of a reciprocating arm 64, which arm is rigidly connected through the rock-shaft 65 with a similar arm 63 under its connected type-receptacle bar and similarly connected with such type-receptacle bar by means of like pivoted connecting-rod 61. In this form of the machine the racks 34 in the bed-plate (shown in Figs. I and XVI) and finger-levers 32, Fig. XVI, are mounted in the front ends of the index-bars, operating in connection with the said racks precisely as already described with reference to the type-bars. It is apparent that each type-receptacle bar connected with its individual index-bar through the system of levers described must exactly coincide with the movement of such index-bar, so that as the index-bar is retracted or advanced to a particular letter so must the type-receptacle bar be retracted or advanced to the same letter, and so on through the series. After the transverse line upon the type-receptacle bars are set as described and corrections made, if needed, the line of type is raised by means of the lifter 36, actuated by the inclines upon the sliding bar 37 in the manner before explained, the sliding bar 37 being attached to the foot-lever 70, as shown at left-hand side in Fig. XXI, by a connecting-rod 71 and bell-crank 72. The line is then compressed to the requisite width by means of a clamp-jaw, such as already described, actuated by connecting-rod 73 and bell-crank lever 74, through similar foot-pedal at the left of said machine. The subsequent operation in taking impression upon matrix material then follows, the same as above described. After the matrix material has been impressed as described, so as to form a long strip thereof, I cut it into the length desired for the page or column of printed matter, attach it to a justifying-table or casting-mold (curved or flat, as may be desired) in the desired position for the electrotype when finished and fill the spaces between the edges of such matrix material with papier-mâché or other suitable material. I then take a casting therefrom in metal in the usual manner for taking stereotype-plates or proceed for the deposition of metal thereon in the usual manner for producing electrotypes.

Having thus described my invention, the following is what I claim as new therein and desire to secure by Letters Patent:

1. In a machine for making matrices for stereotyping or electrotyping reading matter, the combination with a suitable supporting, guiding and retaining bed, of a series of longitudinally-adjustable type-holding troughs or carriers, having compressible sides tapered from end to end, and arranged on the bed with their tapers extending in opposite directions, a font of character type borne by said carriers and independently adjustable therein, means for adjusting the type-carriers longitudinally to bring the required characters into alinement, a type-lifter extending transversely athwart and beneath the type-carriers, means for advancing the type-lifter to elevate the desired line of type, means for retaining the type-carriers in their adjusted position, and compressing them within the width of the page or column, a platen depressible relatively to the carriers, matrix material interposed between the platen and the type, and means for feeding the matrix material line by line.

2. In a machine for forming matrices for stereotyping or electrotyping reading matter, the combination of a series of type-carriers each constructed with compressible sides, a font of character type borne by the said carriers and independently movable therein, for setting a line of type, an adjustable abutment jaw on one side of the set of type-carriers and a clamp-jaw on the other side for justifying and locking the line of type so set.

3. In a machine for forming matrices for stereotyping or electrotyping reading matter, the combination of a series of independently-adjustable type-carrying troughs, each bearing a font or complement of separately-movable characters, means for locking said type-troughs in their adjusted position for bringing the required series of characters in line, means for lifting such line of type relatively to the type-troughs, a sheet or ribbon of matrix material carried on a suitable reel, an intermittently-rotated cylindrical platen, means for pressing said cylindrical platen upon the matrix material interposed between it and the line of type, a drying-cylinder and a take-up reel or cylinder for the matrix-ribbon.

4. In a machine of the character described, the combination with the impression-cylinder, of the moistening-font, the steam-heated drying-cylinder and the water-pipe from said drying-cylinder to said font.

5. The combination of a series of alternately-arranged tapering type-holders each carrying a font of type set to read one above another and of successively-decreasing thickness from end to end of the holder; mechanism for shifting the type-holders independently to bring selected type into alinement; mechanism to lift the selected line of type and support it in raised position; a cylindrical platen and reels carrying a sheet of matrix material mounted in a vibrating frame to take the impression of the line of type; and mechanism imparting step-by-step rotation to the platen to shift the matrix-sheet line by line after each impression; substantially as described.

6. The combination with a font of loosely-fitting type and with suitable clamping devices, of the type holder or bar having a normally bulging spring side, a solid bottom and transverse notches in the bottom, and means for compressing such type-bars laterally for justification, substantially as described.

7. The combination of type-holders, having the compressible sides, the lateral clamp and the connected type-lifting device.

8. The combination of individually shiftable type-holders, the locking device therefor, the lateral clamping device, the connected type-lifting device, the impression-cylinder, the rocking frame in which said cylinder is journaled and the adjustable means for automatic rotation of said cylinder in the intervals of impression.

9. The combination with the impression-cylinder of the moistening-font, the steam-heated drying-cylinder and the water-pipe from said drying-cylinder to said font.

GEORGE B. SHEPARD.

Witnesses:
  LOUIS HASBROUCK,
  LYDIA A. HASBROUCK.